Also laser
ion beam

Feb. 21, 1967 S. ZAROMB 3,305,666

METHODS AND APPARATUS FOR TREATING CONDUCTIVE SURFACES

Filed Aug. 28, 1963

INVENTOR.
SOLOMON ZAROMB

BY

ALAN K. ROBERTS
ATTORNEY

United States Patent Office 3,305,666

Patented Feb. 21, 1967

3,305,666

METHODS AND APPARATUS FOR TREATING CONDUCTIVE SURFACES

Solomon Zaromb, 376 Monroe St., Passaic, N.J. 07053

Filed Aug. 28, 1963, Ser. No. 305,161
9 Claims. (Cl. 219—383)

This invention relates to methods and apparatus for generating non-conductive line patterns in electrically conductive surfaces or coatings.

In my previously filed and copending application Serial No. 257,988 filed February 12,1963 I have disclosed a novel optical shutter in which strips of light-permeable conductive material are positioned on a light-permeable base and the strips are positioned in an electrolyte so that an electrolytic deposition can be effected to render the aforesaid strips selectively opaque thereby constituting an optical shutter.

I now propose to make precise fine line patterns through a conductive coating deposited on a light-permeable base with techniques which are adapted to mass production.

In accordance with the invention there is proposed the use of a localized overload technique in which a very high energy density is applied over a very short period of time to destroy precise patterns of coatings applied to a light-permeable base.

It is accordingly an object of the invention to provide improved methods and devices for treating conductive coatings in such a manner as to establish very precise non-conductive patterns therein.

The methods and devices of the invention as well as objects, features and advantages of the invention will be better understood from the following detailed description of some preferred embodiments of the invention as illustrated in the accompanying drawing in which.

Figure 3:
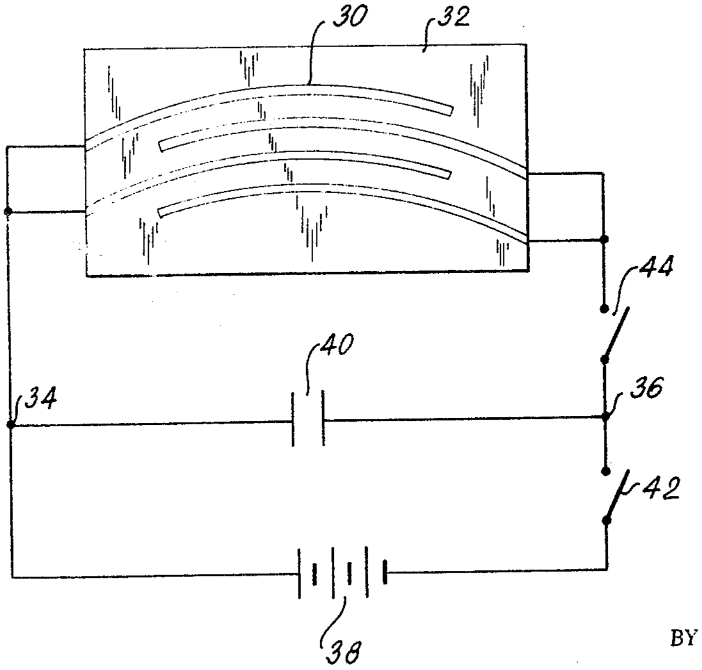

FIGURE 3 diagrammatically illustrates a further form of the invention and a means for applying a surge of electrical energy thereto.

With respect to the environmental background of the invention, I have previously proposed using a tin oxide coating on the surface of a light-permeable base such as glass, quartz and the like in association with an electrolyte and in such a manner that an electrical potential is applied to the coating to cause an electrolytic deposition thereon whereby the coating which is normally light-permeable is caused to become opaque. This process is reversible and I have found that apparatus of this type functions very well as an optical shutter device.

The invention has as one of its principal objects the providing of fine line patterns by concentrating heat along very narrow lines on a tin oxide surface of the above-noted type.

According to a broader aspect of the invention, this can be achieved by means of fine beams such as electron beams, ion beams and high intensity light beams such as provided by a laser. All of such methods provide for a concentrated heat to achieve localized evaporation.

According to a preferred embodiment of my invention, however, the lines to be rendered nonconductive can be provided in a conductive coating by applying knife edges opposite to the coating and applying an electrical potential to the knife edges.

Depending on the thickness of the conductive coating, the areas to be made nonconductive may require an energy density of at least 100 joules per square centimeter or more applied within a time period of less than 1 millisecond and preferably within less than 100 microseconds. A preferred range of energy densities consists of the range lying between 100 and 1,000 joules per square centimeter depending on the conditions of the coating.

As will be noted hereinunder, when a localized current overload is employed, care must be taken to insure that the effective resistance between the knife edges and the conductive coating is high compared to the resistivity of the coating itself. This will avoid overloading the coating which is to be preserved by avoiding excessively low or excessively high effective contact resistances.

Figure 1:
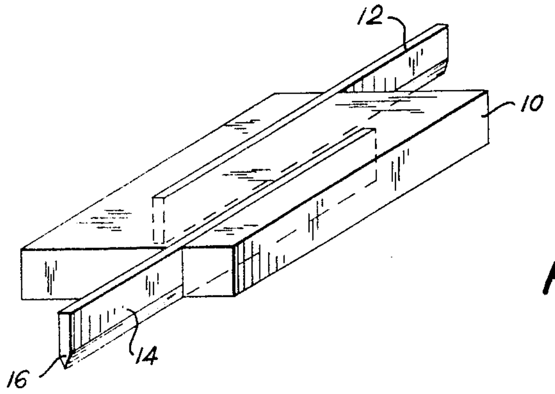
FIGURE 1 is a diagrammatic and perspective view of a first embodiment of the invention.

In FIG. 1 is shown a first embodiment of the invention as applied to apparatus and in this figure is diagrammatically illustrated a block 10 of a dielectric substance such as plastic or the like in which are embedded parallel plates 12 and 14 extending from opposite ends of the block 10.

Plates 12 and 14 are of rectilinear form and are, in fact, spaced parallel elements provided with knife edges such as the knife edge 16. The knife edges are exposed from the bottom of the block 10 and are the zones on which a high electrical energy is dissipated.

Said plate may be formed of tungsten, molybdenum or other such refractory metals which would prove most suitable for the purpose although plain steel and copper may also be employed.

The plates employed in accordance with the invention may be mechanically sharpened but are preferably electrolytically sharpened to afford a knife edge most suitable for the purpose of burning nonconductive lines in conductive coatings.

Figure 2:
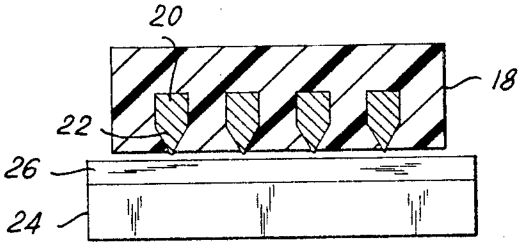
FIGURE 2 is a partially cross-sectional and diagrammatic view of a second embodiment of the invention showing a device of the invention in the course of being applied to a conductive coating on a light-permeable base.

FIG. 2 illustrates a block 18 of dielectric material in which four plates 20 are embedded, each of said plates being provided with a knife edge 22 exposed at the lowest surface of the block 18.

Also illustrated in FIG. 2 is a light-permeable substrate 24 having thereon a light-permeable conductive coating 26 formed, for example, of tin oxide in a manner which is now known per se.

As will appear from FIG. 2, the method of the invention comprises burning a pattern into a conductive surface by applying knife edges to the surface in correspondence with the desired pattern and dissipating electrically generated energy into the surface at the knife edges.

This energy as aforesaid may have a magnitude preferably greater than 100 joules per square centimeter and, within this limitation, further within a range of some 100 to 100,000 joules per square centimeter. The energy is preferably dissipated in less than 1 millisecond and preferably in less than 100 microseconds.

Whereas in the embodiments of FIGS. 1 and 2 the plates have been shown to be of rectilinear form, the plates may also be of arcuate or other form as shown in FIG. 3.

In FIG. 3 are shown arcuate plates 30 embedded in a dielectric block 32, alternate of such plates being connected to opposite poles or terminals 34 and 36 connected alternately to a power source 38 or a capacitor 40 by means of a switch 42.

In known manner the capacitor 40 is charged by the power source 38 whereafter the switch 42 is opened and the capacitor 40 coupled via a switch 44 to the arcuate plates 30 mentioned above.

There will result an instantaneous discharge of the capacitor 40 whereby energy or heat will be dissipated into the coating to which the plates 30 are applied.

While I have heretofore concentrated on one technique by means of which a conductive coating can be vaporized to divide the same into separate elements, I should now like to develop by way of example one of the other techniques I suggested above.

Laser beams can act in two ways on tin oxide coatings:

(a) If the beam has a wavelength equal to or higher than 2 microns, it will be directly absorbed by the coating.

(b) Alternately, with light beams of shorter wavelength, a light-absorbing coating and/or an intense "Q-switched" pulse of lased light can be applied to the tin-oxide coating.

(c) It sometimes also suffices to apply a less intense laser pulse to the interface between the conductive oxide coating and the light absorbing coating, by having the laser beam pass through the transparent substrate before hitting the absorbing coating, especially if the absorbing coating consists of a high melting nonvolatile material such as carbon or boron carbide. The heat absorbed at the interface then causes preferential evaporation of the more volatile tin oxide film.

The laser beam may be either (*a*) shaped into the desired pattern by means of a suitable combination of lenses and template (the latter formed preferably by photo-etching a light reflecting foil or film) or (*b*) moved in the desired pattern over the film (like a pen).

There will be obvious to those skilled in the art, many modifications and variations of the methods and apparatus set forth above. These modifications and variations will not depart from the scope of the invention if defined by the following claims.

What is claimed is:

1. Apparatus for providing a nonconductive pattern in a conductive coating, said apparatus comprising: at least two metallic blades, a dielectric body, each of said blades being embedded in said body and including a knife edge exposed from one side of said dielectric body in the form of at least part of said pattern, and means for applying a surge of electrical current between said coating and said knife edges, said surge of current being confined by said dielectric body to a narrow area of said coating directly facing said knife edges and being sufficient to effect at least partial destruction of part of said coating in said narrow area.

2. Apparatus as claimed in claim 1 comprising means for applying an electrical potential between said blades and said coating.

3. Apparatus as claimed in claim 1 wherein said means supplies energy at a magnitude of at least 100 joules/cm.$^2$ at the surface of said coating facing said knife edges in less than 1 millisecond.

4. Apparatus as claimed in claim 1 comprising a plurality of parallel blades.

5. Apparatus as claimed in claim 4 comprising means for applying an electrical potential between alternate of said blades.

6. A method of providing a non-conductive pattern in a conductive coating, said method comprising a step of juxtaposing against said coating at least two metallic blades embedded in a dielectric body, said blades having knife edges shaped in accordance with a substantial portion of said non-conductive pattern, and a step of applying to said coating a short and intense electrical energy pulse by passing a surge of electrical current between said knife edges and said coating, said current being confined by said dielectric body to those portions of said coating directly facing said knife edges.

7. A method as claimed in claim 6 wherein said conductive coating is on a light-permeable base.

8. A method as claimed in claim 7 wherein the conductive coating contains tin oxide.

9. A method as claimed in claim 6 providing a non-conductive pattern in a conductive coating by applying to said coating localized energy in excess of 100 joules/cm.$^2$ in less than one millisecond.

References Cited by the Examiner

UNITED STATES PATENTS

| | | | |
|---|---|---|---|
| 1,493,014 | 5/1924 | Boyle | 120—42 |
| 1,651,074 | 11/1927 | Steffens | 219—384 |
| 1,864,592 | 6/1932 | Griffin et al. | 219—50 |
| 2,587,239 | 2/1952 | Smith | 339—98 |
| 2,680,184 | 6/1954 | Smith | 219—383 X |
| 2,716,180 | 8/1955 | Dubilier | 219—384 X |
| 3,017,486 | 1/1962 | Kogan et al. | 219—383 |
| 3,119,919 | 1/1964 | Pratt | 219—384 |
| 3,140,379 | 7/1964 | Schleich et al. | 219—69 |
| 3,161,752 | 12/1964 | Stuart | 219—69 |
| 3,183,339 | 5/1965 | Lins | 219—383 |
| 3,214,563 | 10/1965 | Ford | 219—69 |

FOREIGN PATENTS

| | | |
|---|---|---|
| 31,041 | 8/1926 | France. |
| 1,089,425 | 9/1964 | France. |

RICHARD M. WOOD, *Primary Examiner.*

ANTHONY BARTIS, *Examiner.*

V. Y. MAYEWSKY, *Assistant Examiner.*